United States Patent
Wigren

(10) Patent No.: US 8,665,937 B2
(45) Date of Patent: Mar. 4, 2014

(54) LOAD ESTIMATION IN WIRELESS COMMUNICATION

(75) Inventor: Karl Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 50 days.

(21) Appl. No.: 13/514,009

(22) PCT Filed: Dec. 10, 2009

(86) PCT No.: PCT/SE2009/051397
§ 371 (c)(1),
(2), (4) Date: Jun. 5, 2012

(87) PCT Pub. No.: WO2011/071428
PCT Pub. Date: Jun. 16, 2011

(65) Prior Publication Data
US 2012/0243594 A1    Sep. 27, 2012

(51) Int. Cl.
*H04B 17/00* (2006.01)
(52) U.S. Cl.
USPC ........... 375/227; 375/144; 375/148; 375/140; 375/147; 375/152; 375/316; 375/340; 375/343; 375/346
(58) Field of Classification Search
USPC ......... 375/227, 144, 148, 140, 147, 152, 316, 375/340, 343, 346
See application file for complete search history.

(56) References Cited

U.S. PATENT DOCUMENTS

| 2004/0162101 A1 | 8/2004 | Kim et al. |
| 2012/0082195 A1* | 4/2012 | Wigren ........................ 375/220 |
| 2012/0163420 A1* | 6/2012 | Persson et al. ................ 375/144 |

FOREIGN PATENT DOCUMENTS

GB    2425684 A    11/2006

OTHER PUBLICATIONS

Wigren, T. et al. "Estimation of Uplink WCDMA Load in a Single RBS" IEEE 66th Vehicular Technology Conference, 2007, VTC-2007, Sep. 30-Oct. 3, 2007, pp. 1499-1503.

* cited by examiner

*Primary Examiner* — Siu Lee
(74) *Attorney, Agent, or Firm* — Coats & Bennett, P.L.L.C.

(57) ABSTRACT

A method for noise rise estimation in a wireless communication system comprises receiving (210) of radio signals. An interference whitening (212) is performed. A useful signal power for a first user after the interference whitening is determined (214) for a plurality of time instances. Furthermore, a first user noise floor compensation factor is derived (216) based on combining weights for the first user used in the interference whitening. A probability distribution for a compensated useful signal power for the first user is estimated (218). A conditional probability distribution of a noise floor measure is computed (220). A noise rise measure for the first user is then calculated (222) based at least on the compensated useful signal power for the first user and the conditional probability distribution of a noise floor measure.

20 Claims, 4 Drawing Sheets

US 8,665,937 B2

LOAD ESTIMATION IN WIRELESS COMMUNICATION

TECHNICAL FIELD

The present invention relates in general to methods and devices for estimation of power-related quantities in cellular communications systems and in particular to such methods and devices in cellular communications systems using interference whitening.

BACKGROUND

Wideband Code Division Multiple Access (WCDMA) telecommunication systems have many attractive properties that can be used for future development of telecommunication services. In particular, the enhanced uplink of the WCDMA system is one ingredient in the mobile broadband solution of WCDMA. Now, in order to retain stability of a WCDMA cell, possibly a cell running enhanced uplink, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor, based on which a noise rise measure can be estimated. An optimal and soft algorithm for noise rise estimation based on a similar basic idea of minimum values is disclosed in the published international patent application WO 2007/024166.

To handle increasing uplink data rates, interference cancellation (IC) is being introduced in WCDMA. A conventional procedure to perform IC is summarized by the following steps. A channel model of the interferer to be cancelled is estimated. This does not cause any additional operations, since this channel model is anyway needed. The transmitted signal of the interferer to be cancelled is also decoded. This is also anyway needed. A replica of the received signal of the interferer to be cancelled is then created, by use of the channel model and the decoded signal. This replica may e.g. be reconstructed as an IQ chip stream. The replica of the interfering signal is subsequently subtracted from the received signal of the user to be decoded, thereby hopefully reducing the remaining power of the interferer to very low power levels.

This procedure obviously affects the load measurement functionality of the WCDMA EUL. Thus, the scheduler must be aware of the instantaneous uplink load in several signal points of the new IC receiver structure in order to be able to utilize the entire amount of resources. Unless such load estimates are made available it will not be possible to exploit the link gains fully, when scheduling EUL users. In the published international patent application WO 2008/097145, load estimation with IC of this conventional type is handled in analogy with earlier noise rise estimation procedures.

Another approach to limit the effect of interference is to use some kind of interference whitening approaches, such as GRAKE, GRAKE+ or chip equalizer. In GRAKE+, a covariance matrix $\hat{R}_u$, u=1, ..., u, with an order equal to the number of fingers is first estimated to capture the interference. The codes not used by the present user u may be used in order to estimate the covariance matrix $\hat{R}_u$. The GRAKE+ receiver thus uses an estimated covariance matrix that models the interference for computation of the combining weights for the users u, u=1, ..., U. Expressed mathematically, it can be written:

$$\hat{R}_u \hat{w}_u = \hat{h}_u, u=1, \ldots, U, \qquad (1)$$

where $\hat{h}_u$, u=1, ..., U, is the net channel response of user u and where $\hat{w}_u$ are the combining weights. The effect of (1) is that GRAKE+ essentially whitens the correlated interference and removes large spectral peaks from interferers at certain finger locations and for certain antenna elements. Thus, in GRAKE+, the user experiences a reduced level of interference, immediately after the weight combining step. Note that GRAKE+ is still a linear receiver.

In order to utilize the reduced interference provided by the GRAKE+ receiver, the load estimations have to be performed taking the interference whitening of the GRAKE+ into account. However, in contrary to what is valid for interference cancellation based on regeneration and subtraction, the thermal noise floor is changed in the same manner as the interference reduction obtained by the GRAKE+ process, and can no longer be treated as constant after interference whitening. A treatment analogue of WO 2008/097145 can therefore not be used for achieving a noise rise estimation, the reason being that WO 2008/097145 requires the noise floor to be constant. There is thus a problem of using the created reduced interference, since no reliable noise rise estimation is available. Similar problems are present for systems utilizing GRAKE, where sub-blocks of the covariance matrix of (1) are used. In other words, power measurements, such as RTWP and RSEPS measurements, after G-rake+ interference whitening are not directly integratable in the optimal filtering step of the RoT and noise floor estimator of prior art, thereby no noise suppression is utilized for said measurements, and thereby an optimal performance is not achieved There is a related type of interference whitening receiver for WCDMA which is also linear, denoted the chip equalizer. The difference between GRAKE+ and the chip equalizer is simply the order of certain basic operations. The consequence is that the problems of providing a reliable noise rise measure are valid for the systems using the chip equalizer as well.

SUMMARY

An object of the present invention is thus to provide methods and arrangements for providing reliable noise rise estimations in wireless communication systems using interference whitening methods, such as the GRAKE+ or the chip equalizer receivers.

The object is achieved by methods and arrangements according to the enclosed independent patent claims. Preferred embodiments are defined by the dependent claims. In general, in a first aspect, a method for noise rise estimation in a wireless communication system comprises receiving of radio signals intended for a plurality of users. An interference whitening is performed on the received radio signals based on one of GRAKE, GRAKE+ and chip equalizer with respect to a first user of the plurality of users. A useful signal power for the first user after the interference whitening is determined for a plurality of time instances. Furthermore, a first user noise floor compensation factor is derived based on combining weights for the first user used in the interference whitening. A probability distribution for a compensated useful signal power for the first user is estimated from at least the determined useful signal power for the first user and the first user noise floor compensation factor. A conditional probability distribution of a noise floor measure is computed based on at least the determined useful signal power for the first user and the first user noise floor compensation factor. A noise rise measure for the first user is then calculated based at least on the compensated useful signal power for the first user and the conditional probability distribution of a noise floor measure.

In a second aspect, an arrangement for noise rise estimation in a wireless communication system comprises a digital receiver and an interference whitener connected to the digital receiver. The interference whitener is based on one of GRAKE, GRAKE+ and chip equalizer. The interference whitener is arranged for providing interference whitening for a plurality of users at an output. The arrangement further comprises a processor connected to the output from the interference whitener. The processor is arranged for determining a useful signal power for a first user for a plurality of time instances and arranged for deriving a first user noise floor compensation factor based on combining weights for the first user used in the interference whitening. The processor is further arranged for estimating a probability distribution for a compensated useful signal power for the first user from at least the determined useful signal power for the first user and the first user noise floor compensation factor and arranged for computing a conditional probability distribution of a noise floor measure based on at least the determined useful signal power for the first user and the first user noise floor compensation factor. The processor is also arranged for calculating a noise rise measure for the first user, based at least on the probability distribution for the compensated useful signal power for the first user and the conditional probability distribution of a noise floor measure.

In a third aspect, a base station of a wireless communication system comprises an arrangement for noise rise estimation according to the second aspect.

One advantage with the present invention is that the reduced interference levels achieved by GRAKE+ or chip equalizer can be fully utilized to increase the total available capacity of a wireless communication system. The invention will thus be beneficial for throughput, capacity and coverage gains associated with new types of IC receiver structures when implemented.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
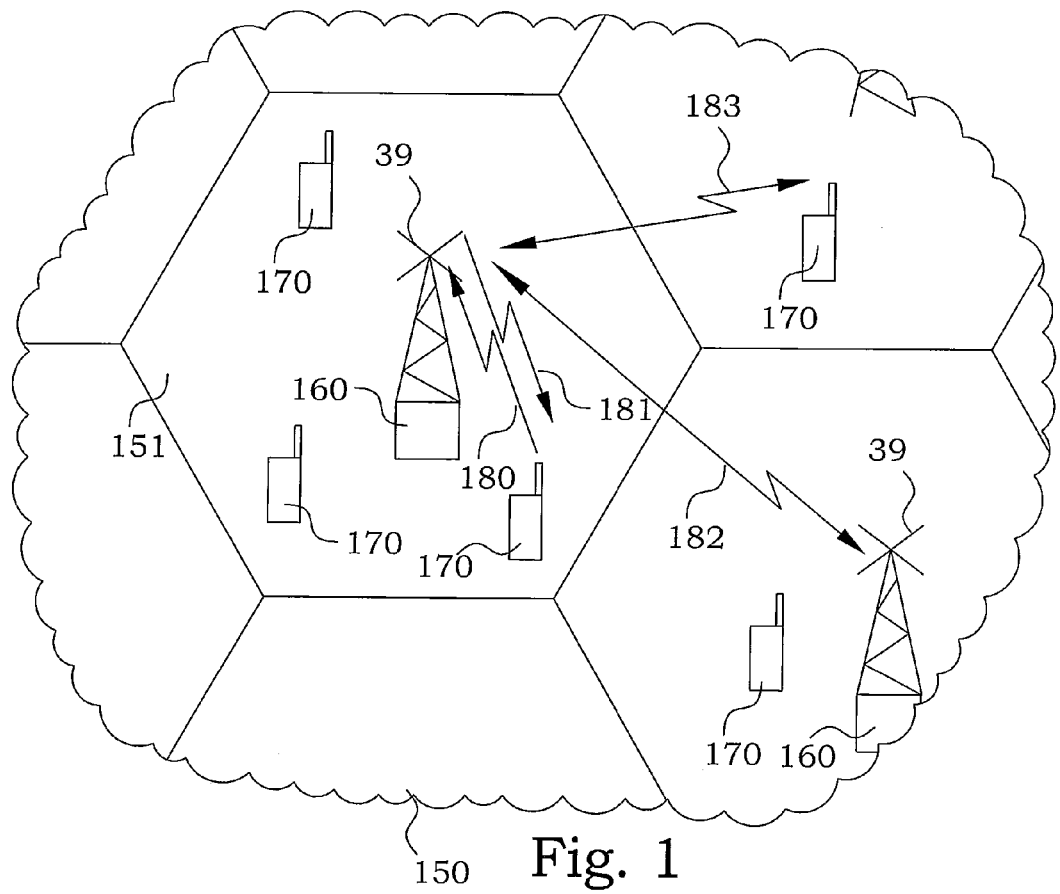
FIG. 1 is a schematic illustration of a wireless communication system.

Throughout the entire disclosure, bold letters in equations refer to vector or matrix quantities.

In the drawings, corresponding reference numbers are used for similar or corresponding parts.

The present invention relates to arrangements and methods in wireless communication systems. FIG. 1 illustrates a schematic view of an embodiment of such a wireless communication system 150. A radio base station 160 communicates via its antenna/antennas 39 with a multitude of user equipments (UE) 170 situated within a cell 151 of the wireless communication system 150. Radio signals transmitted from the RBS 160 to the UEs 170 are denoted as downlink signals 181, and radio signals transmitted from the UEs 170 to the RBS 160 are denoted as uplink signals 180. This invention mainly considers the uplink signals, whereby arrangements for noise rise estimation typically are provided in the RBS 160. Besides the intentional uplink signals 180, the RBS 160 also receives interfering signals 182, 183.

In order to understand the solved problems and advantages with the present invention, a short summary of prior art load estimation principles are presented as a background. Without IC, the load at an antenna connector is given by the noise rise, or rise over thermal (RoT), RoT(t), defined by:

$$RoT(t) = \frac{RTWP(t)}{N(t)}, \qquad (2)$$

where N(t) is the thermal noise level as measured at the antenna connector. The thermal noise level at the antenna connector is essentially time invariant and if any variations in time occur, they are generally small and slow. It remains to define what is meant with RTWP(t). The definition used here is simply the total wideband power:

$$RTWP(t) = \sum_{k=1}^{K} P_k(t) + I^N(t) + N(t), \qquad (3)$$

also measured at the antenna connector. Here $I^N(t)$ denotes the power as received from neighbour cells ($^N$) of the communication system. As will be seen below, the major difficulty of any RoT estimation algorithm is to separate the thermal noise power from the interference from neighbour cells.

Another specific problem that needs to be addressed when determining the load is that the signal reference points are, by definition, at the antenna connector. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (3) are equally affected by the scale factor error so when (2) is calculated, the scale factor error is cancelled as $$RoT^{Digital\ Receiver}(t) = \frac{RTWP^{Digital\ Receiver}(t)}{N^{Digital\ Receiver}(t)} = \frac{\gamma(t)RTWP^{Antenna}(t)}{\gamma(t)N^{Antenna}(t)} = RoT^{Antenna}(t). \quad (4)$$

In order to understand the fundamental problem of neighbour cell interference when performing load estimation, note that $$I^N(t)+N(t)=E[I^N(t)]+E[N(t)]+\Delta I^N(t)+\Delta N(t), \quad (5)$$

where E[ ] denotes mathematical expectation and where A denotes the variation around the mean. The fundamental problem can now be clearly seen. Since there are no measurements available in the RBS that are related to the neighbour cell interference, a linear filtering operation can at best estimate the sum $E[I^N(t)]+E[N(t)]$. This estimate cannot be used to deduce the value of E[N(t)]. The situation is the same as when the sum of two numbers is available. Then there is no way to figure out the values of the individual numbers. This issue is analysed rigorously for the RoT estimation problem in published international patent application WO 2007/024166 where it is proved that the noise power floor is not mathematically observable.

Figure 2:
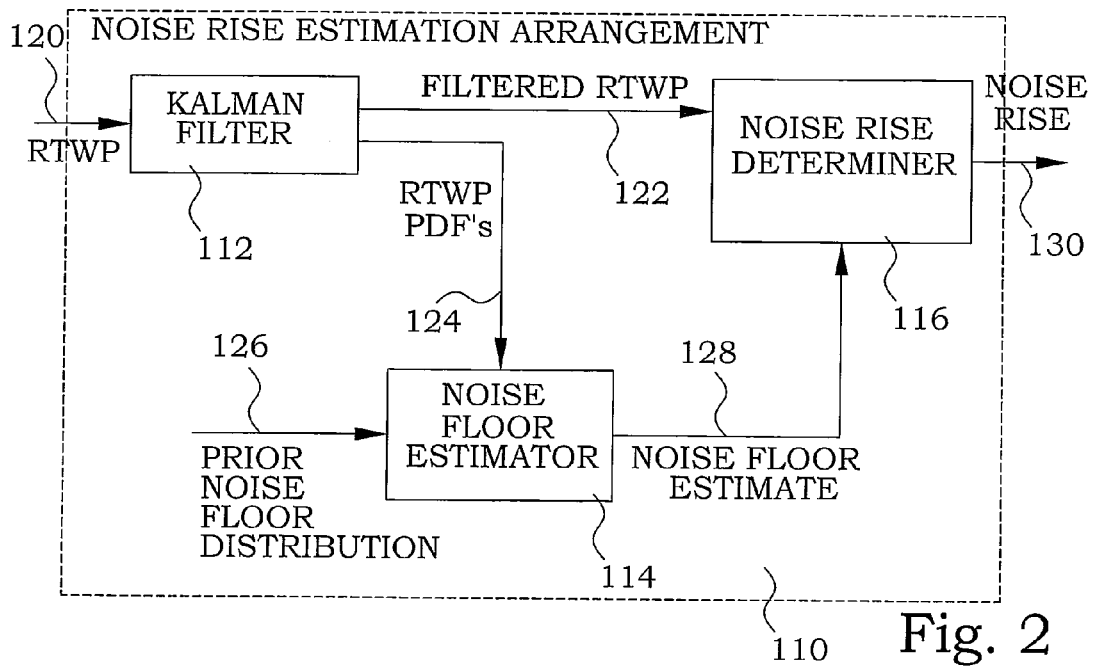
FIG. 2 is a schematic illustration of a noise rise estimation arrangement.

An embodiment of the RoT estimation algorithm currently in use is depicted in FIG. 2. It is described in detail in the published international patent application WO 2007/024166. The algorithm estimates the RoT, as given by (2). The main problem solved by the estimation algorithm is the accurate estimation of the thermal noise floor N(t). This is based on the assumption of that the experienced noise floor varies in time only very slowly, which enables the use of estimation algorithms. Since it is not possible to obtain exact estimates of this quantity due to the neighbour cell interference, the estimator therefore applies an approximation, by consideration of the soft minimum as computed over a relative long window in time.

In particular, an arrangement 110 for noise rise estimation in a wireless communication system is supplied with RTWP measurements 120. The RTWP measurements 120 are used in a Kalman filter 112 to produce filtered estimates 122 of the RTWP as well as probability density functions 124 of the RTWP. These probability density functions 124 are provided to a noise floor estimator 114, in which noise floor estimates 128 are provided with knowledge of a prior noise floor distribution 126. The noise floor estimator 114 operates preferably with a sliding window algorithm. The noise floor estimates 128 and the filtered estimates 122 of the RTWP are provided to a noise rise determiner 116, producing an output of a noise rise measure, in this embodiment a RoT value 130.

It is, as noted above, important to understand that this estimation relies on the fact that the noise floor is essentially constant over very long periods of time (disregarding the small temperature drift).

The sliding window algorithm of the above section has the disadvantage of requiring a large amount of storage memory. This becomes particularly troublesome in case a large number of instances of the algorithm are needed, as may be the case when IC is introduced in the uplink. To reduce the memory consumption a recursive algorithm was disclosed in the published international patent application WO 2007/0055626. That algorithm reduces the memory requirements of the sliding window scheme discussed above at least by a factor of 100.

The algorithms referred to in the sections concerning sliding window and recursive algorithms further above build on pre-configured information of the approximate level on the thermal noise power floor, and thereby indirectly on the RTWP and RSEPS power levels.

Sometimes, this pre-configuration may be erroneous or the conditions may have changed due to e.g. faulty hardware or external disturbances from e.g. radar stations. This may cause large but relatively slow variations of the levels of the thermal noise floor, the RTWP and the RSEPS. The consequence is a reduced performance of the algorithms described the sections concerning sliding window and recursive algorithms, which is due to a misaligned power quantization grid.

In order to cope with this problem, the published international patent application invention WO2008/041895 discloses means for adaptation and integration of a slowly varying power scale factor into the algorithms of sliding window and the recursive algorithms. Similar adaptation can be also be employed within the present invention. It is stressed that the invention of WO2008/041895 has nothing to do with interference whitening.

Figure 3:
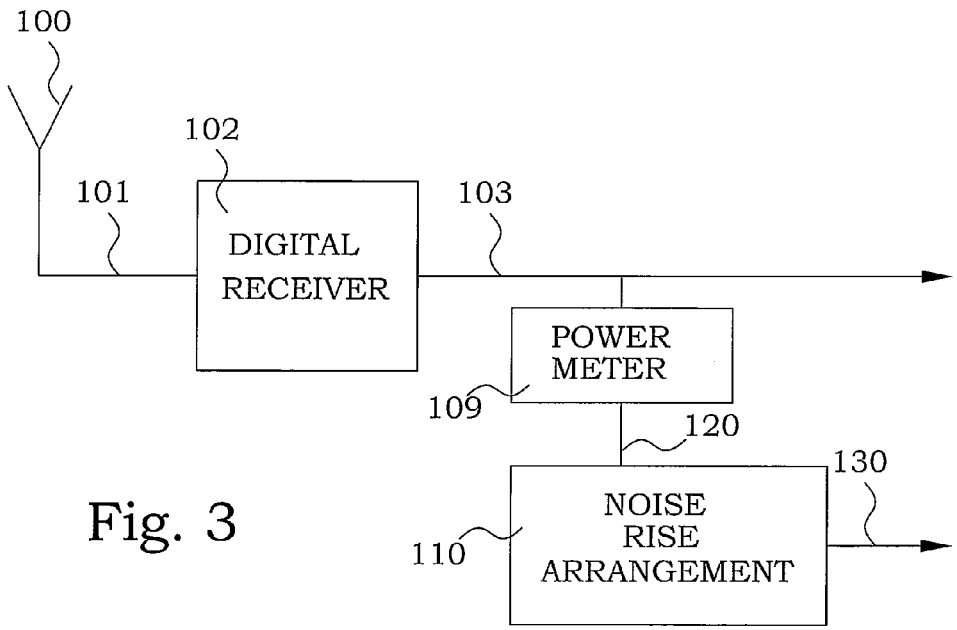
FIG. 3 is a schematic illustration of a receiver chain including a noise rise arrangement.

FIG. 3 schematically illustrates the arrangement 110 for noise rise estimation in relation to the receiver chain. An antenna 100 receives electromagnetic signals and gives rise to a received analogue signal 101, which is provided to a digital receiver 102. The digital receiver 102 provides a stream of digital signals 103 representative to the analogue signals, however, as mentioned above modified with a certain scale factor. A measurement unit 109 is connected to the stream of digital signals 103 and performs measurements of received total wideband powers 120, which are handed on to the arrangement 110 for noise rise estimation.

Figure 4:
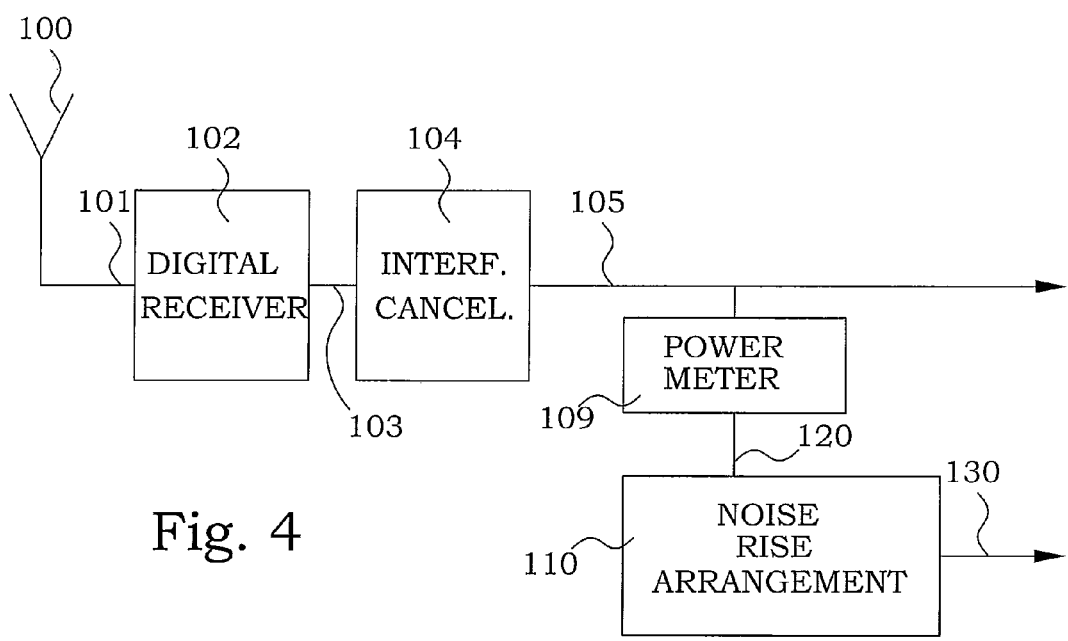
FIG. 4 is a schematic illustration of a receiver chain including interference cancellation and a noise rise arrangement.

As mentioned in the background section, different interference cancellation methods based on regeneration and subtraction are often used. This is schematically illustrated in FIG. 4. The stream of digital signals 103 is provided to an interference canceller 104, where signals not intended for a particular user are removed. An interference cancelled digital signal 105 intended for a particular user is provided as output. As also mentioned before, load estimation can be applied also to such interference cancelled digital signal 105, where the measured RTWP measure refers to the digital signal after interference cancelling. For IC with regeneration and subtraction there is no change of the scale factor for the thermal noise power floor. The consequence is that the RoT estimation algorithms are still applicable in this case, since a constant noise power level is estimated.

It is important to observe that the effect of this procedure is different for different users, since an interferer is a user on its own. The consequence for load estimation is that there is no longer a uniform way to look on the interference of the WCDMA uplink. The load instead becomes individual for each user. Hence combining user interference to a general uplink cell load is no longer trivial.

The objects of the present invention are achieved by the development of optimal filtering algorithms that have a number of properties. The RTWP (received total wideband power), as defined after G-rake+ whitening IC processing, is integrated into a new time variable extended Kalman filter based front end of the thermal noise floor and RoT estimator. Preferably, also the RSEPS (Received scheduled EUL power share, i.e. the scheduled traffic in the enhanced uplink), as defined after G-rake+ whitening IC processing, is integrated into the new time variable extended Kalman filter based front end of the thermal noise floor and RoT estimator. The procedures take account for the fast time varying scale factor effects caused by G-rake+ interference whitening, in the new front end. Furthermore, optimal filtering of said RTWP and RSEPS, defined after G-rake+ processing, is provided in order to suppress measurement disturbances and enhance the performance.

The present invention provides solutions where load estimations reflect the reduced interference experienced by users exploiting interference whitening receivers. The load of a particular single user exploiting GRAKE, GRAKE+ or the chip equalizer can be estimated. Also, a load estimation for the whole cell can be obtained based on such single user load estimation.

The present invention disclosure is focused on GRAKE+. However, also systems using GRAKE or chip equalizers can be configured in a similar manner.

The load estimations that reflect the reduced interference experienced by users exploiting interference whitening receivers can be obtained by estimating the received signal and exploiting results from the GRAKE process by matrix-vector operations in order to scale the noise floor estimate, obtained based on the non-interference-whitened signals, to the influence of the interference whitening process. Unfortunately, such operations require quite large computational power, which is why such a solution may be inappropriate for applications with limited available computational power. According to further approaches, only computation of inner products may be necessary, which limits the required computational complexity significantly, possibly of the order of at least ten times. However, since the thermal noise power floor must be estimated from RTWP before interference whitening processing, e.g. G-rake+ processing, the estimated thermal noise power floor may suffer from a raised level, which also reduces the performance of the RoT, estimated after G-rake+ interference whitening.

Therefore, as compared to such approaches based on noise power floor estimations before interference whitening, the present invention provides further processing of signal quantities obtained by prior art approaches, and utilizes algorithms that enable thermal noise floor estimation and RoT estimation after interference whitening. This provides for optimal filtering of the signal quantities allowing for further suppression of measurement noise affecting the signal quantities. The performance of thermal noise floor and RoT estimation for G-rake+ whitening IC receivers is thus enhanced.

The invention discloses means for load estimation in terms of RoT accounting directly for the interference whitening gains of the G-rake+receiver. Performance is optimized, since the invention allows for optimal filtering and noise suppression of RTWP and RSEPS measurements at the so called sufficient statistics signal point of the G-rake+ receiver, i.e. after interference whitening gains have materialized. In order to allow for this filtering, the invention provides novel means to integrate and compensate for fast time varying scale factor variations that is an inherent effect of the G-rake+ interference whitening processing.

One main scope is to develop and disclose procedures for code power estimation per user, capturing the effect of interference whitening. Furthermore, procedures for code power to interference ratio estimation per user, capturing the effect of interference whitening should also be provided. Also RoT estimation or other noise rise measures per user, capturing the effect of interference whitening is calculated.

The present approach uses the estimation at the point where the "sufficient statistics" (the performance metric) used for decoding is available. Sufficient statistics refers to the exact knowledge of the probability distribution functions of a stochastic process, over time. A Gaussian stochastic process is e.g. completely defined by its mean value and covariance matrix, both as a function of time—no other information is needed to write down the probability distribution functions of said Gaussian stochastic process. In case of the G-rake+ receiver such a sufficient statistics is available after interference whitening as discussed further below.

Figure 5:
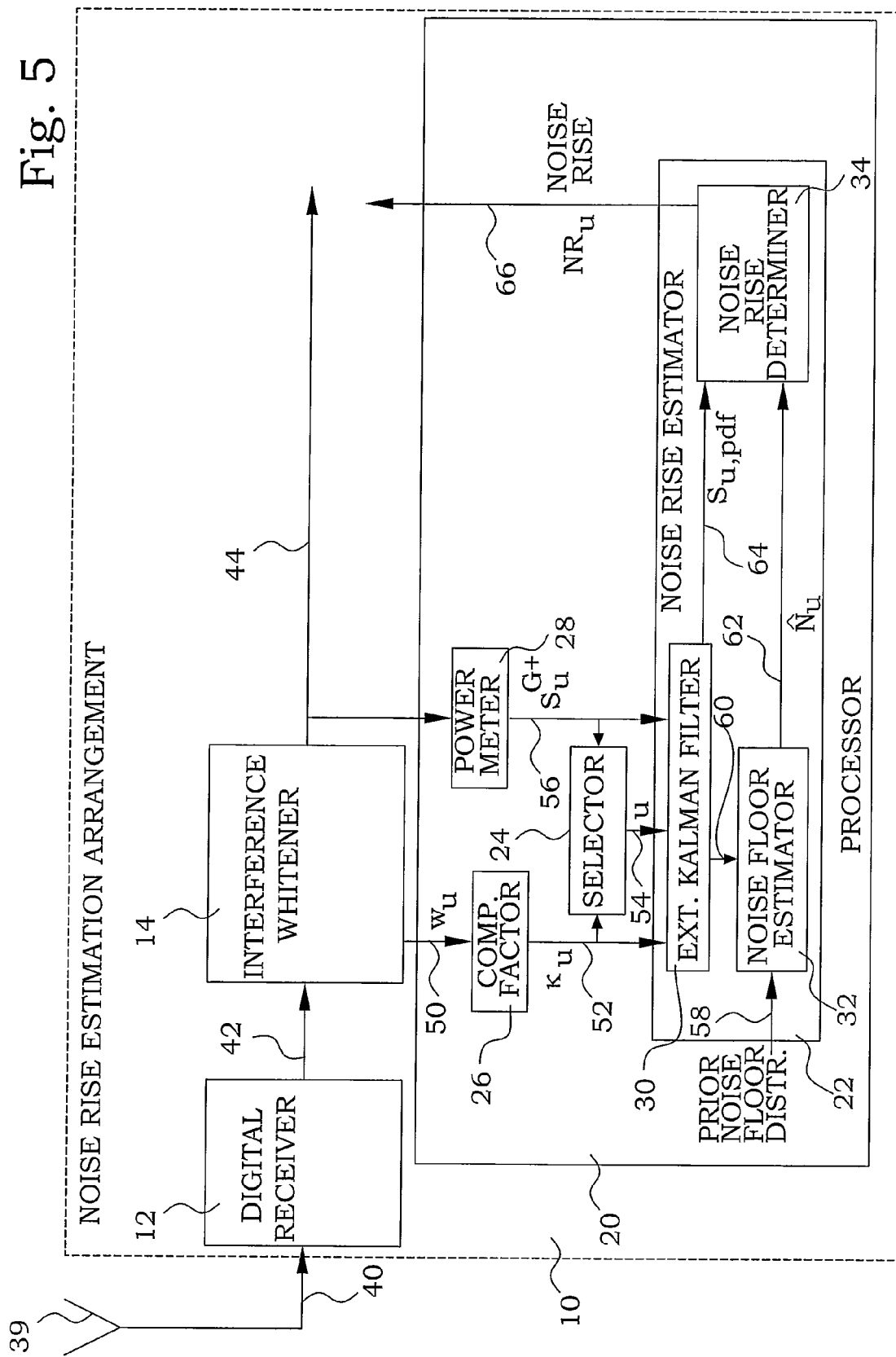
FIG. 5 is a block scheme of an embodiment of a noise rise estimation arrangement according to the present invention.

An embodiment of an arrangement 10 for noise rise estimation in a wireless communication system is schematically illustrated in FIG. 5. The arrangement 10 for noise rise estimation comprises a digital receiver 12, an interference whitener 14 and a processor 20. The digital receiver 12 is connected to an antenna 39 for reception of a received analogue signal 40 representing electromagnetic signals received at the antenna 39. The interference whitener 14 is connected to the digital receiver 12 for receiving digital signals 42 therefrom. Typically, the digital receiver 12 and the interference whitener 14 are integrated as one unit, or rather that the interference whitener 14 is a part of the digital receiver 12, whereby the connection between them has to be regarded as an internal or logical connection. The interference whitener 14 is generally based on one of GRAKE, GRAKE+ and the chip equalizer, and in this particular embodiment on GRAKE+. The interference whitener 14 is intended for providing interference whitening for a plurality of users at an output, providing interference whitened digital signals 44.

The processor 20 is connected to the output from the interference whitener 14. The processor 20 has a power meter 28 that is connected to be responsive to interference whitened digital signals 44 output from the interference whitener 14. In this embodiment, the power meter 28 determines a useful signal power $S_u^{G+}$ for each user of the plurality of users as defined after the interference whitening. Such determination is performed for a plurality of time instances, in order to enable a subsequent filtering process During the interference whitening process, performed by the interference whitener 14, combining weights $w_u$ are obtained, see e.g. equation (1). These combining weights $w_u$ 50 are supplied to a compensation factor calculating section 26 of the processor 20. The compensation factor calculating section 26 is arranged for deriving a user noise floor compensation factor 52 based on combining weights for that user used in the interference whitening. As will be described more in detail further below, the noise floor compensation factor $\kappa_u$ for a user u is preferably derived as the product of a conjugate transpose of the combining weights $w_u$ 50 and the combining weights $w_u$ 50 themselves if an approximation for white noise power floor can be accepted. This is the case in the illustrated embodiment. Alternatively, if a coloured noise power floor has to be taken into account, the noise floor compensation factor $\kappa_u$ 52 for the user u is derived as the trace of the product of a conjugate transpose of the combining weights $w_u$ 50, a thermal noise covariance matrix representing the correlation due to the spectral shape of the whole wideband channel and the combining weights $w_u$ 50 themselves divided by the trace of the covariance matrix. The thermal noise covariance matrix representing the correlation due to the spectral shape of the whole wideband channel is also obtainable from the interference whitening process.

In the present embodiment, the processor 20 preferably comprises a selector 24, connected to the output of the compensation factor calculating section 26 and the power meter 28, thus receiving the noise floor compensation factor $\kappa_u$ 52 for each user u and respective useful signal power $S_u^{G+}$ 56 for each user u. The selector 24 is arranged for selecting a first user from the plurality of users based on interference situation after interference whitening. The first user is going to be used as a model user for calculating a noise rise measure that in some respect is representative for the entire system. In the present particular embodiment, the selector 24 is arranged for performing a selection of the first user as the user of the plurality of users having a worst interference situation after interference whitening. In other words, since different users experience different interference situations after an interference whitening process, there is no common noise rise measure for all users of a system. In order to being able to calculate a noise rise measure that is safe for all users, the user that is most exposed for interference is selected, and a noise rise measure for that user can be used as a limit of possible individual noise rise measures. A "worst case" scenario is thus adapted in such a situation.

In the present embodiment, since the processor is arranged for determining a respective useful signal power for the plurality of users after the interference whitening for a plurality of time instances for deriving a respective user noise floor compensation factor for the plurality of users based on combining weights for the plurality of users used in the interference whitening, a quantity expressing an interference situation based on these factors can be used for the selection. In this embodiment the selection of the first user is performed by selecting that user of the plurality of users that has the largest ratio between the respective useful signal power and the respective user noise floor compensation factor.

In alternative embodiments, also other users than the "worst case" can be selected. For instance, a user corresponding to a certain percentile of the distribution of an interference measure of all users can be used. A noise rise measure for such a user can then not be used for any user without risking instability. However, by compensating such a noise rise measure with a predetermined factor, a reasonably safe maximum noise rise measure can be obtained. This approach can be useful in situations where e.g. a single user has a considerably worse interference situation than all other users and thereby influences the maximum noise rise measure too much.

In a further alternative, more than one user can be selected for be used during the noise rise determination procedure. This is discussed further below.

The processor 20 further comprises a noise rise estimator 22. The noise rise estimator 22 in turn comprises an extended Kalman filter 30 that is arranged for estimating a probability distribution for a compensated useful signal power for the first user $S_{u,pdf}$ 64. In this embodiment, the selected first user u 54 is provided from the selector 24. The extended Kalman filter 30 is provided with the determined useful signal power for the users, and by the input 54 from the selector 24, the determined useful signal power 56 for the first user can be distinguished. Also, the extended Kalman filter 30 is provided with the user noise floor compensation factors 52, and also by the input 54 from the selector 24, the first user noise floor compensation factor can be distinguished. The probability distribution for a compensated useful signal power is estimated by use of a model taking the fast varying noise floor level into account by use of the first user noise floor compensation factor. An example of such an extended Kalman filtering is described more in detail below. Here it can just be noted that by estimating the determined useful signal power for the first user corrected for the first user noise floor compensation factor, instead of estimating the determined useful signal power directly, a time invariant or at least slowly varying quantity is regained as an estimation quantity.

In analogy with prior art noise rise estimation processes, the outcome of the extended Kalman filtering process is additionally used for purposes of determining a noise floor. However, unlike previous approaches, such noise floor determination process is now performed on the power quantities compensated for interference whitening influences. To this end, the processor 20, and in the present embodiment, the noise rise estimator 22 comprises a noise floor estimator 32. The noise floor estimator 32 is arranged for computing a conditional probability distribution of a noise floor measure based on at least the determined useful signal power for the first user and the first user noise floor compensation factor. The noise floor estimator 32 is in this embodiment provided with knowledge of a prior noise floor distribution 58 for the conditional probability distribution of a noise floor $\hat{N}_u$ 62 valid for the first user.

The processor 20, and in the present embodiment, the noise rise estimator 22 comprises further a noise rise determiner 34. The noise rise determiner 34 connected to the outputs from the extended Kalman filter 30 and the noise floor estimator 32 and has therefore access to the noise floor $\hat{N}_u$ 62 for the first user and a probability distribution for a compensated useful signal power for the first user $S_{u,pdf}$ 64. The noise rise determiner 34 is thus arranged for calculating a noise rise measure $NR_u$ 66 for the first user, based at least on the compensated useful signal power for the first user $S_{u,pdf}$ 64 and the conditional probability distribution of a noise floor measure $\hat{N}_u$ 62 for the first user.

In this embodiment, the different functionalities of the processor 20 are illustrated as separate part units. However, anyone skilled in the art realises that the functionalities can be configured and realised in different manners, separately or integrated, fully or partly. The part units associated with the different functionalities should therefore only be considered as separate units concerning their functionality.

The arrangement 10 for noise rise estimation may in an alternative embodiment be further arranged for defining a system noise rise measure, if the noise rise measure $NR_u$ 66 for the first user cannot be used directly as a system noise rise measure. There are a number of different possibilities. One alternative, as was indicated further above is to select a user that has not the worst interference situation to achieve the noise rise measure $NR_u$ 66. Such a noise rise measure $NR_u$ 66 then has to be modified to fit as a general system noise rise measure. If, for instance, a first user is selected having a compensation factor that corresponds to the 75% percentile of the distribution of all user compensation factors, then the noise rise measure $NR_u$ 66 for this user can be modified according to a typical distribution of user noise rise measures to obtain a relevant system noise rise measure.

In another alternative, noise rise measures $NR_u$ 66 can be determined for more than one user at a time, and the final system noise rise measure can be determined from an evaluation of the spread of the different individual noise rise measures $NR_u$ 66.

The selection of the first user is preferably made relatively frequently, since the interference situation may vary quite rapidly. If it is required that a worst case user is selected at all instances, the selection is preferably made for each sampling occasion. The operation of the extended Kalman filter 30 may then require a longer sampling time than the time between changes of worst user. In such a situation, it may be beneficial if at least the extended Kalman filtering is performed for more than one user at a time, preferably all users, and that the selection of the first user is made in connection with the actual noise rise determination.

Figure 6:
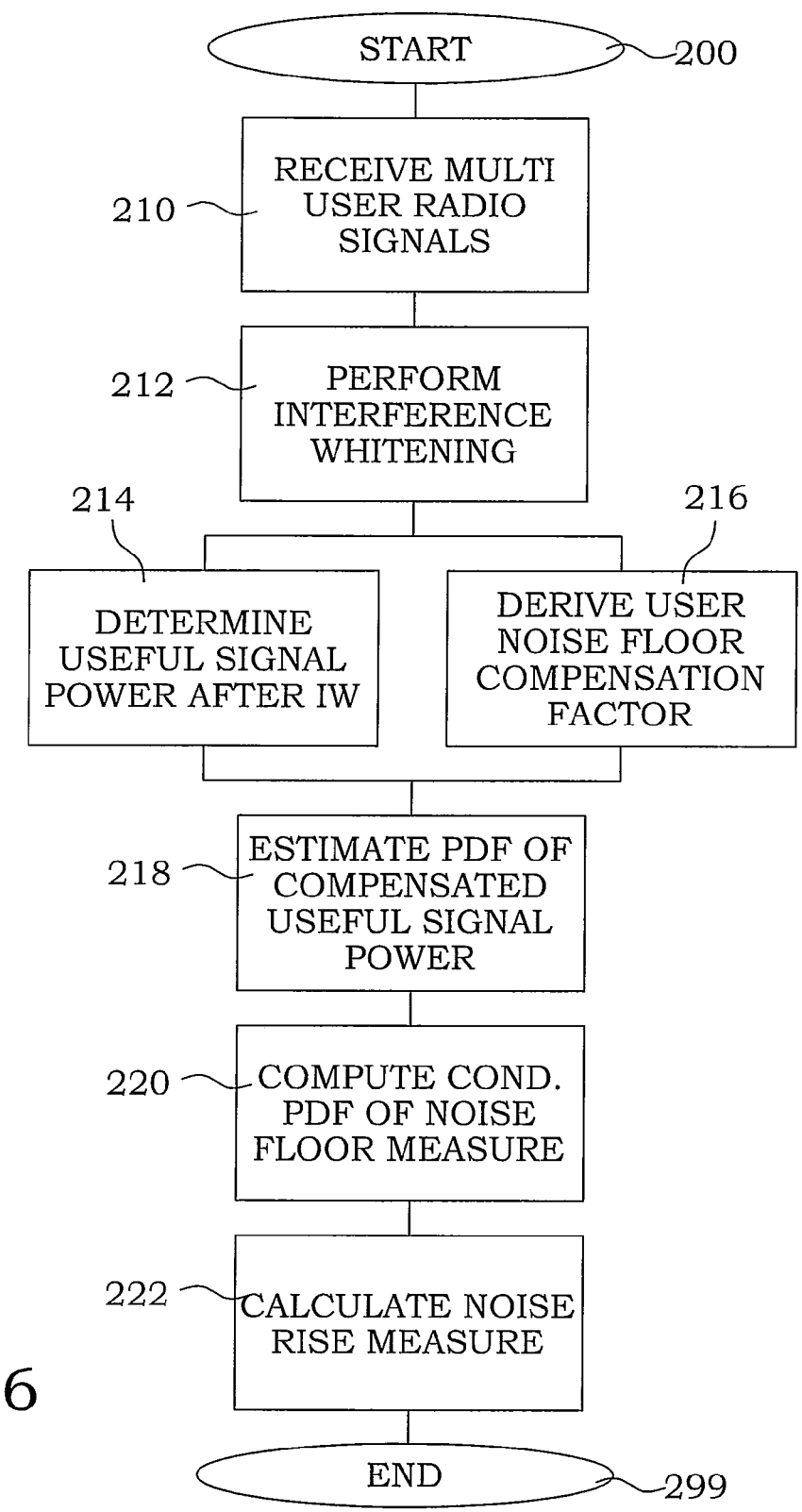
FIG. 6 is a flow diagram of an embodiment of a method according to the present invention.

In FIG. 6, a flow diagram of an embodiment of a method according to the present invention is illustrated. The method for noise rise estimation in a wireless communication system begins in step 200. In step 210, radio signals intended for a plurality of users are received at a plurality of time instances. An interference whitening is performed on the received radio signals in step 212. This interference whitening based on one of GRAKE, GRAKE+ and chip equalizer. The interference whitening is performed with respect to at least a first user of the plurality of users. Preferably, the interference whitening is performed with respect to a plurality of users and most preferably for all users. In step 214, a useful signal power for at least the first user, and preferably for a plurality of users and most preferably for all users, after said interference whitening for a plurality of time instances. In step 216, a first user noise floor compensation factor is derived based on combining weights for the first user used in the interference whitening. Preferably, the noise floor compensation factors are obtained as described in connection with FIG. 5. Preferably, noise floor compensation factors for a plurality of users are derived, and most preferably for all users. The steps 214 and 216 are basically independent of each other and may therefore be performed in any order or partly or entirely concurrently.

In step 218, a probability distribution for a compensated useful signal power for said first user is estimated from at least the determined useful signal power for the first user and the first user noise floor compensation factor. This may also be performed for a plurality of users. A conditional probability distribution of a noise floor measure is computed in step 220 based on at least the determined useful signal power for the first user and the first user noise floor compensation factor. This step may also be performed for a plurality of users. Finally, in step 222 a noise rise measure for the first user is calculated based at least on the compensated useful signal power for the first user and the conditional probability distribution of a noise floor measure. The process is ended in step 299.

As indicated above, in a preferred embodiment, the selection of the first user is made for a purpose. To that end an interference whitening on the received radio signals based on one of GRAKE, GRAKE+ and chip equalizer is performed with respect to respective ones of the plurality of users. Also, a respective useful signal power for the plurality of users after the interference whitening is determining for a plurality of time instances. The first user is then selected from the plurality of users based on the interference situation after interference whitening. In an even more preferred embodiment, the selection of the first user is made as the user of the plurality of users having a worst interference situation after interference whitening. The interference situation may be diagnosed by evaluating a ratio between the respective useful signal power and the respective user noise floor compensation factor. In order to be able to select any user as the first user, a respective user noise floor compensation factor for the plurality of users is derived based on combining weights for the plurality of users used in the interference whitening. The user having the largest ratio between the respective useful signal power and the respective user noise floor compensation factor is then selected as the first user.

Another possibility, also briefly indicated above, is to calculate a respective noise rise measure for at least a number of the plurality of users. The respective noise rise measures are then combined into a system noise rise measure. This then requires that the performance of the interference whitening, the determination of a useful signal power, the deriving of a user noise floor compensation factor, the estimating of a probability distribution for a compensated useful signal power, the computing of a conditional probability distribution of a noise floor measure and the calculation of a noise rise factor have to be performed with respect to each respective user.

The sliding window algorithm is based on processing of RTWP. Now, when the uplink traffic increases it may happen that the periods of very low RTWP that is needed in order to find the thermal noise power floor on which the RoT estimation rests, become very rare. The effect of this would be a raised thermal noise power floor. In turn this may cause underestimation of the RoT, which may lead to overscheduling, which may in turn cause instability. To counter this, RSEPS measurements are useful since this measurement can be subtracted from the measured RTWP by optimal extended Kalman filtering.

The received scheduled enhanced uplink power (RSEPS) constitutes a part of the sum of the code powers. The enhanced uplink transmissions may have properties of high and even load on the transmission power. At the contrary, voice transmissions are typically instead very bursty in their nature. Even at high voice transmission loads, there are instances, where the instantaneous contribution to the total power of a cell is low. This means that an estimate of an appropriate noise floor is probable if only voice transmissions are present.

A power quantity that would be very suitable for estimating the noise floor is a difference between the received total wideband power and the received scheduled enhanced uplink power. Such a power quantity will have contributions that typically are either very small or of a bursty character, which means that low values, in the vicinity of the true noise floor, are fairly probable. This principle was used in the published International patent application WO2008/097145 to estimate a noise floor for systems without interference whitening.

A similar approach can be utilized in the present invention. The RSEPS power is thereby determined after an interference whitening process for a plurality of time instances. In a typical implementation, the processor is thereby further arranged for determining a RSEPS power after the interference whitening for a plurality of time instances. The estimating of a probability distribution and the computing of a conditional probability distribution are then further based on the determined RSEPS power. In a typical implementation, the processor is further arranged for performing the estimating and the computing further based on the determined RSEPS power.

A detailed embodiment based on GRAKE+ of the present invention is here below presented in more mathematical terms.

Measurement of Load after IC in GRAKE+ and Chip Equalizers

To see how load can be estimated taking account of the GRAKE+ IC gain, the powers after weight combining are studied at sufficient statistics level. First, it is assumed that the received signal of user u on code $k \in \Omega_u$ is $$y_{u,k} = h_u s_{u,k} + I_{u,k} + N_{u,k}, u=1, \ldots, U, k=1, \ldots, K \quad (6)$$

where $\Omega_u$ denotes the set of codes for user u, $s_{u,k}$, $u=1, \ldots, U$, $k=1, \ldots, K$, is the signal, $I_{u,k}$, $u=1, \ldots, U$, $k=1, \ldots, K$, is the interference and $N_{u,k}$, $u=1, \ldots, U$, $k=1, \ldots, K$, is the (thermal) noise signal (not power) and $\hat{h}_u$, $u=1, \ldots, U$, is the net channel response of user u. GRAKE+ then performs weight combining to get the sufficient statistics $z_{u,k}^{G+}$ according to the equations $$\hat{z}_{u,k}^{G+} = \hat{w}_u^H y_{u,k} = \hat{w}_u^H \hat{h}_u s_{u,k} + \hat{w}_u^H I_{u,k} + \hat{w}_u^H N_{u,k}, u=1, \ldots U, k=1, \ldots, K. \quad (7)$$

$$\hat{R}_u \hat{w}_u = \hat{h}_u, u=1, \ldots, U \quad (8)$$

Here $\hat{w}_u$ are the combining weights of GRAKE+, whereas the estimated covariance matrix that models the interference for computation of the combining weights for the users u is given by $\hat{R}_u$. Equations (7) and (8) have two main implications; one indicating how power measurements can be done and one indicating the scale factor problem which is addressed below.

Using equation (7) it can be seen that the effect of the GRAKE+ weight combining is the same as if an artificial received signal $z_{u,k}^{G+}$ would be processed. Since these signals obviously reflect the weight combining and thereby the IC gains of the GRAKE+ receiver, $z_{u,k}^{G+}$, $u=1, \ldots, U$, $k=1, \ldots, K$, is believed to be a relevant starting point for load estimation.

As stated above, the load estimator operates by processing of the RTWP and in the future possibly the RSEPS. For this reason, similar power signals need to be formed from the $z_{u,k}^{G+}$, $u=1, \ldots, U$, $k=1, \ldots, K$, in order to reuse the load concept applied without IC.

User Powers Associated with the GRAKE+ Sufficient Statistics

Squaring (7) and assuming a low degree of correlation between its three terms, leads to:

$$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} N_{u,k}^H \hat{w}_u \equiv S_{u,k}^{G+} + I_{u,k}^{G+} + N_{u,k}^{G+}, u=1, \ldots, U, k=1, \ldots, K. \quad (9)$$

Here, $S_{u,k}^{G+}$ is the useful code signal power for the user u after interference whitening, $I_{u,k}^{G+}$ is the code interference signal power for the user u after interference whitening and $N_{u,k}^{G+}$ is the code noise floor power for the user u after interference whitening.

The rise over thermal (2), as seen by user u is now, by definition $$RoT_u^{G+} \equiv \frac{S_u^{G+} + I_u^{G+} + N_u^{G+}}{N_u^{G+}} \quad (10)$$

$$S_u^{G+} = \sum_{k \in \Omega_u} S_{u,k}^{G+} \quad (11)$$

$$I_u^{G+} = \sum_k I_{u,k}^{G+} \quad (12)$$

$$N_u^{G+} = \sum_k N_{u,k}^{G+}. \quad (13)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (9) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (9)-(13).

Computation of the Useful Signal Power

The signal power is computed directly from (11). Using (9) and (11) then results in:

$$S_u^{G+} = \sum_{k \in \Omega_u} S_{u,k}^{G+} \quad (14)$$

$$= \hat{w}_u^H \hat{h}_u \hat{h}_u^H \hat{w}_u \sum_{k \in \Omega_u} |s_{u,k}|^2$$

$$= \hat{w}_u^H \hat{h}_u \hat{h}_u^H \hat{w}_u \hat{E}_{s,u}$$

$$= |\hat{w}_u^H \hat{h}_u|^2 \hat{E}_{s,u},$$

$$u = 1, \ldots, U.$$

Note that computation of the signal energy $\hat{E}_{s,u}$ is quite intricate, including e.g. the involved beta factors.

Computation of the Noise Floor Power

White Noise Power Floor

The idea here is to rely on the thermal noise power floor estimation algorithm used in prior art methods, to estimate the thermal noise power floor before any GRAKE+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the compensation factor by which the thermal noise power is scaled. To compute this quantity, first note that when the wideband thermal noise power floor is estimated before GRAKE+ processing, the following quantity is estimated $$\hat{N} = \frac{1}{M} \sum_{m=1}^{M} \sum_{k=1}^{K} (N_{u,k}^m)^H N_{u,k}^m \xrightarrow{M \to \infty} KE[(N_{u,k})^H N_{u,k}] = \quad (15)$$

$$KP_{N\,u,k} = K \frac{1}{K} P_N = N_0,$$

where $N_0$ is the thermal noise power floor. The power at the sufficient statistics signal processing point is however:

$$\hat{N}^{G+} = \frac{1}{M} \sum_{m=1}^{M} \sum_{k=1}^{K} (\hat{w}_u^H N_{u,k}^m)^H \hat{w}_u^H N_{u,k}^m \quad (16)$$

$$= \frac{1}{M} \sum_{m=1}^{M} \sum_{k=1}^{K} tr((\hat{w}_u^H N_{u,k}^m)^H \hat{w}_u^H N_{u,k}^m)$$

$$= \frac{1}{M} \sum_{m=1}^{M} \sum_{k=1}^{K} tr(\hat{w}_u^H N_{u,k}^m (\hat{w}_u^H N_{u,k}^m)^H)$$

$$= \frac{1}{M} \sum_{m=1}^{M} \sum_{k=1}^{K} tr(\hat{w}_u^H N_{u,k}^m (N_{u,k}^m)^H \hat{w}_u)$$

$$= tr\left(\sum_{k=1}^{K} \hat{w}_u^H \left(\frac{1}{M} \sum_{m=1}^{M} N_{u,k}^m (N_{u,k}^m)^H\right) \hat{w}_u\right) \xrightarrow{M \to \infty}$$

$$tr(K \hat{w}_u^H E[N_{u,k} (N_{u,k})^H] \hat{w}_u)$$

$$= tr(K \hat{w}_u^H (N_0/K) I \hat{w}_u)$$

$$= \hat{w}_u^H \hat{w}_u N_0$$

$$= \hat{w}_u^H \hat{w}_u \hat{N}.$$

The conclusion is that the thermal noise floor at the sufficient statistics signal point can be obtained from the noise floor estimate before GRAKE+ processing, by a multiplication with the compensation factor:

$$\kappa_u^{G+} = (\hat{w}_u)^H \hat{w}_u, u=1, \ldots, U. \quad (17)$$

This gives:

$$\hat{N}_u^{G+} = \kappa_u^{G+} \hat{N}, u=1, \ldots, U. \quad (18)$$

The computation of the compensation factor only requires an additional inner product for each user.

Colored Noise Power Floor

This subsection discusses the case where the result of (15) is replaced by the more general assumption:

$$\frac{1}{M} \sum_{m=1}^{M} \sum_{k=1}^{K} N_{u,k}^m (N_{u,k}^m)^H \xrightarrow{M \to \infty} KE[N_{u,k}(N_{u,k})^H] = K\frac{N_0}{K} R_N = N_0 R_N, \quad (19)$$

i.e. the case when sampling is fast enough to reflect the shape of the uplink spectrum. In this case it follows that (15) is transformed to:

$$\hat{N} = \frac{1}{M} \sum_{m=1}^{M} \sum_{k=1}^{K} (N_{u,k}^m)^H N_{u,k}^m \xrightarrow{M \to \infty} KE[(N_{u,k})^H N_{u,k}] \quad (20)$$

$$= Ktr(E[N_{u,k}(N_{u,k})^H]) = N_0 tr(R_N).$$

Furthermore, (16) is transformed into $$\hat{N}^{G+} = N_0 tr(\hat{w}_u^H R_N \hat{w}_u). \quad (21)$$

The end result in this case is the compensation factor:

$$\kappa_u^{G+} = \frac{tr(\hat{w}_u^H R_N \hat{w}_u)}{tr(R_N)}. \quad (22)$$

Computation of Interference Signal Power Using Available SINRs

In the possible implementing ASIC, the code power to interference ratio is:

$$(C/I)_u^{G+} = \frac{S_u^{G+}}{I_u^{G+} + N_u^{G+}}, u=1, \ldots, U. \quad (23)$$

It can be noted that in (23), all quantities except $I_u^{G+}$ have already been computed, see (16) and (18). Using these quantities, (23) can be solved for $I_u^{G+}$, giving:

$$I_u^{G+} = \frac{S_u^{G+}}{(C/I)_u^{G+}} - \kappa_u^{G+} \hat{N}, u=1, \ldots, U. \quad (24)$$

In the ASIC, the $(C/I)_u^{G+}$ quantity is typically not directly available. It can however be directly related to $SINR_u$ which is estimated in the ASIC. This is performed as:

$$(C/I)_u^{G+} = \frac{(\beta_{u,EDPCCH}^2 + \beta_{u,DPDCH}^2 + n_{u,codes}\beta_{u,EDPDCH}^2)}{\beta_{u,EDPCCH}^2 SF_{u,EDPCCH}} SINR_u^{G+} = \quad (25)$$

$$\frac{\beta_{u,effective}^2}{SF_{u,EDPCCH}} SINR_u^{G+}$$

which gives:

$$I_u^{G+} = \frac{S_u^{G+}}{(C/I)_u^{G+}} - \kappa_u^{G+} \hat{N} = \frac{SF_{u,EDPCCH}}{\beta_{u,effective}^2} \frac{S_u^{G+}}{SINR_u^{G+}} - \kappa_u^{G+} \hat{N}. \quad (26)$$

$SINR_u$ is defined as (25). It is understood by anyone skilled in the art that also other code power to interference ratio measures can be used to calculate C/I and/or $SINR_u$ in order to provide a similar quantity.

Computation of Rise Over Thermal

When (14), (18) and (26) are inserted in (10), the end result becomes:

$$RoT_u^{G+} \equiv \frac{S_u^{G+} + I_u^{G+} + \kappa_u^{G+} \hat{N}}{\kappa_u^{G+} \hat{N}} = \frac{S_u^{G+}}{\kappa_u^{G+} \hat{N}} \left(1 + \frac{SF_{u,EDPCCH}}{\beta_{u,effective}^2} \frac{1}{SINR_u^{G+}}\right), \quad (27)$$

$$u = 1, \ldots, U.$$

Note that (27) provides some interesting insights. When $SINR_u$ is high, then the RoT for the user is essentially determined by the remaining own power of the user—the RoT then increases when the $SINR_u$ gets worse.

Computation of RTWP and RSEPS Equivalents

The computation of the equivalent of RTWP and RSEPS power, at the sufficient statistics signal point, is discussed next. It follows from (27) that the equivalent of RTWP, seen by user u, becomes $$S_{u,RTWP}^{G+} = S_u^{G+} \left(1 + \frac{SF_{u,EDPCCH}}{\beta_{u,effective}^2} \frac{1}{SINR_u^{G+}}\right), u = 1, \ldots, U. \quad (28)$$

The equivalent of RSEPS, as seen by user u, is therefore obtained by a summation over the RSEPS user codes, when still using $\hat{h}_u$ and $\hat{w}_u$:

$$S_{u,RSEPS}^{G+} = \sum_{u_{RSEPS}=1}^{U_{RSEPS}} S_{u(u_{RSPES})}^{G+}, \quad (29)$$

$$u = 1, \ldots, U$$

$$S_{u(u_{RSEPS})}^{G+} = \sum_{k \in \Omega_{u(u_{RSEPS})}} S_{u,k}^{G+} \quad (30)$$

$$= \hat{w}_u^H \hat{h}_u \hat{h}_u^H \hat{w}_u \sum_{k \in \Omega_{u(u_{RSEPS})}} |s_{u,k}|^2$$

$$= \hat{w}_u^H \hat{h}_u \hat{h}_u^H \hat{w}_u \hat{E}_{s,u(u_{RSPES})}$$

$$= |\hat{w}_u^H \hat{h}_u|^2 \hat{E}_{s,u(u_{RSEPS})},$$

$$u_{RSEPS} = 1, \ldots, U_{RSEPS}.$$

Note again that the channel model of user u is retained when summing over the codes of the RSEPS users. Hence the computation needs to be performed once for each user.

Combining

There are many approaches defined when combining the user powers of (17), (28)-(30) into quantities valid for the entire uplink. A first combining method is to average scale factor compensated user powers. The scale factor compensation is needed to equalize the importance of the different users. However, since averaging does not necessarily capture the situation for users with severe interference situations, close to causing power rushes, averaging is probably not the preferred approach.

The preferred approach is rather to search for the user with the worst interference situation and use the power values for that user. In case of (27) this gives:

$$u_{max} = \arg\max_u \left( \frac{S_u^{G+}}{K_u^{G+}} \right) \quad (31)$$

$$\max(S_{RTWP}^{G+}) = S_{u_{max},RTWP}^{G+} \quad (32)$$

$$\max(S_{RSEPS}^{G+}) = S_{u_{max},RSEPS}^{G+}. \quad (33)$$

Pre-Filtering

The RoT estimator operates on power samples with TTI rate—for the scheduler in the WCDMA uplink this corresponds to either 2 ms or 10 ms. The quantities above therefore needs to be filtered and combined to TTI rate estimates. It is hence, for generality, assumed that the following filtered estimates are produced by this step:

$$RTWP_{u_{max}(t)}^{G+}(t) = f_{RTWP}(\{S_{u_{max}(t)}^{G+}(t')\}_{t' \in TTI}) \quad (34)$$

$$RSEPS_{u_{max}(t)}^{G+}(t) = 10\log^{10}(f_{RSEPS}(\{S_{u_{max}(t),RSEPS}^{G+}(t')\}_{t' \in TTI})/RTWP_{u_{max}(t)}^{G+}(t)) \quad (35)$$

$$\kappa_{u_{max}(t)}^{G+}(t) = (\hat{w}_{u_{max}(t)})^H \hat{w}_{u_{max}(t)}(t) \quad (36)$$

Scale Factor Compensated RoT Estimation Front End for RSEPS

As should be clear from FIG. 5, the way to introduce RSEPS processing for load estimation with IC is to generalize the Kalman filter block, to include the RTWP and RSEPS measurements (34), (35), together with scale factor compensation using (36). The section below shows how this is achieved.

The extended Kalman Filter

All quantities have now been defined and the extended Kalman filter can be applied with any combination of state model and measurement model above. This filter is given by the following matrix and vector iterations, $$C^{G+}(t) = \left.\frac{\partial c(x^{G+})}{\partial x^{G+}}\right|_{x^{G+} = \hat{x}^{G+}(t|t-T)} \quad (37)$$

$$K_f^{G+}(t) = P^{G+}(t|t-T)(C^{G+}(t))^T$$
$$\left(C^{G+}(t)P^{G+}(t|t-T)(C^{G+}(t))^T + R_2^{G+}(t)\right)^{-1}$$

$$\hat{x}^{G+}(t|t) = \hat{x}^{G+}(t|t-T) + K_f^{G+}(t)\left(y^{G+}(t) - C^{G+}(t)\hat{x}^{G+}(t|t-T)\right)$$

$$P^{G+}(t|t) = P^{G+}(t|t-T) - K_f^{G+}(t)C^{G+}(t)P^{G+}(t|t-T)$$

$$\hat{x}^{G+}(t+T|t) = A(t)\hat{x}^{G+}(t|t) + Bu(t)$$

$$P^{G+}(t+T|t) = A(t)P^{G+}(t|t)A(t)^T + R_1(t).$$

The quantities introduced by the filter iterations (37) are as follows. t is the time, T is the TTI sampling period, $\hat{x}^{G+}(t|t-T)$ denotes the state prediction, based on data up to time t-T, $\hat{x}^{G+}(t|t)$ denotes the filter update, based on data up to time t, $P^{G+}(t|t-T)$ denotes the covariance matrix of the state prediction, based on data up to time t-T, and $P^{G+}(t|t)$ denotes the covariance matrix of the filter update, based on data up to time t. A(t) is the systems matrix, B(t) is the control gain matrix. $C^{G+}(t)$ denotes the linearized measurement matrix (linearization of the nonlinear measurement equation $c(x^{G+}(t))$ around the most current state prediction, this motivating the superscript), $K_f^{G+}(t)$ denotes the time variable Kalman gain matrix, $R_2^{G+}(t)$ denotes the measurement covariance matrix, and $R_1(t)$ denotes the system noise covariance matrix. Finally $y^{G+}(t)$ denotes the available power measurements after the IC gain has materialized and u(t) is the control signal (not used here). It can be noted that $R_1(t)$ and $R_2^{G+}(t)$ are often used as tuning variables of the filter. In principle the bandwidth of the filter is controlled by the matrix quotient of $R_1(t)$ and $R_2^{G+}(t)$. The filter is initialized by providing initial values to $\hat{x}^{G+}(t|t-T)$ and $P^{G+}(t|t-T)$. As above the superscript $^{G+}$ denotes that the quantity is valid after the IC gain of G-rake+ has materialized.

Below, the superscript $^{G+}$ is introduced immediately below for the measurement related quantities, the estimated states and the estimated covariances - this is natural since the measurements are performed after IC gain processing. The systems matrix and the systems covariance matrix as well as the systems noise is not directly dependent on IC gain. This explains the nomenclature applied in what follows.

The general model behind the filter (37) is:

$$x^{G+}(t+T) = A(t)x^{G+}(t) + Bu(t) + v(t) \quad (38)$$

$$y^{G+}(t) = c(x^{G+}(t)) + e^{G+}(t) \quad (39)$$

$$R_1(t) = E[v(t)(v(t))^T] \quad (40)$$

$$R_2^{G+}(t) = E[e^{G+}(t)(e^{G+}(t))^T]. \quad (41)$$

The remaining parts of this mathematical description provides detailed models for the above quantities.

State space models with RSEPS processing

State space models for RSEPS based load estimation without IC is known from prior art, see WO2008/097145. In that disclosure the focus is on modifications enabling processing directly using the measured powers after the G-rake+ IC gain has materialized. Therefore, all the alternatives listed in WO2008/097145 are not reproduced here.

Random Walk Modeling of the Two States after G-Rake+ Scale Factor Compensation

In order to provide an estimate of the residual power in the digital receiver (i.e. the received total wideband power minus the received scheduled enhanced uplink power (shared)), and to compute a noise rise measure, a two state model needs to be introduced. The selection of states is, as usual, arbitrary. However, one natural choice is to use one state that describes the RSEPS and one state that describes "the rest" of the power, here denoted the residual power. It should be noted that in case the objective is limited to the estimation of a noise floor measure, it is possible to use a one state model.

The states are defined to be the powers after scale factor compensation, with the scale factor compensation being modeled by the generalized output equation defined below.

Noting that these states describe powers and are therefore necessarily positive (it is assumed that any power measurements defined logarithmically using e.g., the dBm scale have been transformed to the linear power domain before processing), they need to include a nonzero mean value. Such mean values are modeled as random walk components. For the selection of states of the present example, this leads to the state definitions:

$$x_{RSEPSPower}^{G+}(t+T) = \begin{pmatrix} x_{RSEPSPower}^{G+}(t+T) \\ x_{RSEPSPowerDynamics}^{G+}(t+T) \end{pmatrix} \quad (42)$$

$$= \begin{pmatrix} 1 & A_{RSEPSPower}^{1}(t) \\ 0 & A_{RSEPSPower}^{2}(t) \end{pmatrix} \begin{pmatrix} x_{RSEPSPower}^{G+}(t) \\ x_{RSEPSPowerDynamics}^{G+}(t) \end{pmatrix} +$$

$$\begin{pmatrix} v_{RSEPSPower}(t) \\ v_{RSEPSPowerDynamics}(t) \end{pmatrix}$$

$$= \begin{pmatrix} 1 & A_{RSEPSPower}^{1} \\ 0 & A_{RSEPSPower}^{2} \end{pmatrix} x_{RSEPSPower}^{G+}(t) +$$

$$v_{RSEPSPower}(t).$$

$$x_{Residual}^{G+}(t+T) = \begin{pmatrix} x_{Residual}^{G+}(t+T) \\ x_{ResidualDynamics}^{G+}(t+T) \end{pmatrix} \quad (43)$$

$$= \begin{pmatrix} 1 & A_{Residual}^{1}(t) \\ 0 & A_{Residual}^{2}(t) \end{pmatrix} \begin{pmatrix} x_{Residual}^{G+}(t) \\ x_{ResidualDynamics}^{G+}(t) \end{pmatrix} +$$

$$\begin{pmatrix} v_{Residual}(t) \\ v_{ResidualDynamics}(t) \end{pmatrix}$$

$$= \begin{pmatrix} 1 & A_{Residual}^{1}(t) \\ 0 & A_{Residual}^{2}(t) \end{pmatrix} x_{ResidualDynamics}^{G+}(t) +$$

$$v_{Residual}(t),$$

$$x^{G+}(t) = \begin{pmatrix} x_{RSEPSPower}^{G+}(t) \\ x_{Residual}^{G+}(t) \end{pmatrix}, \quad (44)$$

$$v(t) = \begin{pmatrix} v_{RSEPSPower}(t) \\ v_{Residual}(t) \end{pmatrix}. \quad (45)$$

$$A(t) = \begin{pmatrix} 1 & A_{RSEPSPower}^{1}(t) & 0 & 0 \\ 0 & A_{RSEPSPower}^{2}(t) & 0 & 0 \\ 0 & 0 & 1 & A_{Residual}^{1}(t) \\ 0 & 0 & 0 & A_{Residual}^{2}(t) \end{pmatrix}, \quad (46)$$

$$B = 0. \quad (47)$$

Here (44) refers to (38). $x_{RSEPSPower}^{G+}(t)$ denotes the state corresponding to the received scheduled enhanced uplink power that is measured as the logarithmic fractional RSEPS quantity, $x_{RSEPSPower\ Dynamics}^{G+}(t)$ denotes the power state variables that are used for modeling of the dynamics of the power that is expressed by the RSEPS quantity. This dynamics is described by the matrices $A_{RSEPSPower}^{1}(t)$ and $A_{RSEPSPower}^{2}(t)$ where the time variation is introduced mainly for generality. The quantity $v_{RSEPSpower}(t)$ is the process noise (i.e. the stochastic modeling error) of the power corresponding to the fractional RSEPS quantity. The notation is the same for the quantities that describe the residual power. Note also that the systems matrix is not yet marked with the superscript $^{G+}$.

At this point is stressed that the quantity that is to be fed into the subsequent noise power floor estimation step is given by $x_{Residual}^{G+}(t)$ and the corresponding estimated variance (see below).

It remains to define the statistical properties of the process noise. As usual these quantities are modeled as white Gaussian zero mean random processes that fulfill:

$$E[v_{RSEPSPower}(t)v_{RSEPSPower}^{T}(t)] = \quad (48)$$

$$\begin{pmatrix} R_{1,RSEPSPower} & 0 \\ 0 & R_{1,RSEPSPowerDynamics} \end{pmatrix}$$

$$E[v_{Residual}(t)v_{Residual}^{T}(t)] = \begin{pmatrix} R_{1,Residual} & 0 \\ 0 & R_{1,ResidualDynamics} \end{pmatrix} \quad (49)$$

$$R_1 = \quad (50)$$

$$\begin{pmatrix} R_{1,RSEPSPower} & 0 & 0 & 0 \\ 0 & R_{1,RSEPSPowerDynamics} & 0 & 0 \\ 0 & 0 & R_{1,Residual} & 0 \\ 0 & 0 & 0 & R_{1,ResidualDynamics} \end{pmatrix}$$

Here E[.] denotes statistical expectation. Note that the special case without power dynamics is readily obtained by deletion of the corresponding states and matrix blocks.

RTWP and RSEPS Measurement Modeling—Nonlinear Processing

Noting that the RSEPS measurement is expressed as a fraction of the RTWP measurement that is defined for joint measurement (defined on exactly the same time interval), it is clear that the measurement equation becomes nonlinear. Furthermore, since the states are defined to be scale factor compensated powers, i.e. powers before G-rake+, and since the measurements are taken after G-rake+, the measurement equation need to express the effect of G-rake+ by a multiplication of the relevant scale factor discussed above. Here the discussion is also limited to the use of the maximum combining principle for the IC gains. The nonlinear measurement model is hence given by:

$$RSEPS^{G+,measurement}(t) = \quad (51)$$

$$q_{RSEPS}\left(10\log^{10}\left(\frac{\kappa_{u_{max}(t)}^{G+}(x_{RSEPSPower}^{G+}(t) + e_{RSEPSPower}^{G+}(t))}{\kappa_{u_{max}(t)}^{G+}(x_{Residual}^{G+}(t) + x_{RSEPSPower}^{G+}(t) + e_{RTWP}^{G+}(t))}\right)\right).$$

Here $x_{RSEPSPower}^{G+}(t)$ denotes the true power of the RSEPS quantity, $e_{RSEPSPower}^{G+}(t)$ denotes the corresponding measurement uncertainty, $x_{Residual}^{G+}(t)$ denotes the true residual power, $e_{RTWP}^{G+}(t)$ denotes the measurement uncertainty of the RTWP measurement and $q_{RSEPS}(.)$ is the quantization function of the RSEPS measurement. The RTWP measurement is similarly defined, $$RTWP^{G+,measurement}(t) =$$
$$q_{RTWP}(10\log^{10}(\kappa_{u_{max}(t)}^{G+}(x_{Residual}^{G+}(t) + x_{RSEPSPower}^{G+}(t) + e_{RTWP}^{G+}(t))) + 30) \quad (52)$$

where the RTWP is measured in dBm and where all power state variables are in Watts. The notation parallels that of the RSEPS measurement. The measurement disturbances are assumed to be zero mean, Gaussian and white, with:

$$E[e_{RSEPSPower}^{G+}(t)]^2 = R_{2,RSEPSPower}^{G+} \quad (53)$$

$$E[e_{RTWP}^{G+}(t)]^2 = R_{2,RTWP}^{G+} \quad (54)$$

The quantization is normally fine enough to be neglected. Here it is assumed that the quantization is neglected. The original definitions of (51) and (52) are then retained, with the quantization effects neglected. This gives, after a Taylor series expansion:

$$RSEPS^{G+,\log\ measurement}(t) \approx \quad (55)$$

$$10\log^{10}\left(\frac{x_{RSEPSPower}^{G+}(t)}{x_{Residual}^{G+}(t) + x_{RSEPSPower}^{G+}(t)}\right) + e_{\log\ RSEPSCompensated}^{G+}(t),$$

where $$E[e^{G+}_{log\,RSEPSCompensated}(t)]^2 \approx \quad (56)$$
$$\left(\frac{10}{\log(10)}\right)^2 \left(\left(\frac{1}{RTWP^{G+,powermeasurement}(t)}\right)^2 R^{G+}_{2,RTWP} + \right.$$
$$\left. \left(\frac{1}{RSEPS^{G+,powermeasurement}(t)}\right)^2 R^{G+}_{2,RSEPSPower}\right)$$

Here $RTTFP^{G+,powermeasurement}(t)$ and $RSEPS^{G+,powermeasurement}(t)$ are the artificial power measurements in watts, that result when (52) and (55) are solved for the state variables. A similar treatment of (52) results in:

$$RTWP^{G+,log\,measurement}(t) \approx$$
$$10\log^{10}\kappa^{G+}_{u_{max}}(x_{RSEPSPower}^{G+}(t)+ x_{Residual}^{G+}(t)))+30+e_{log\,RTWPcompensated}^{G+}(t) \quad (57)$$

where $$E[e^{G+}_{log\,RTWPCompensated}(t)]^2 \approx \quad (58)$$
$$\left(\frac{10}{\log(10)}\right)^2\left(\left(\frac{1}{RTWP^{G+,powermeasurement}(t)}\right)^2 R^{G+}_{2,RTWP}\right).$$

Furthermore, the cross coupling becomes:

$$E[e^{G+}_{log\,RTWPCompensated}(t)e^{G+}_{log\,RSEPSCompensated}(t)] \approx \quad (59)$$
$$-\left(\frac{10}{\log(10)}\right)^2\left(\left(\frac{1}{RTWP^{powermeasurement}(t)}\right)^2 R_{2,RTWP}\right).$$

It follows that the measurement equations corresponding to (39) can be formulated as:

$$y^{G+}(t) = c(x^{G+}(t)) + e^{G+}(t) \quad (60)$$

$$y^{G+}(t) = \begin{pmatrix} RSEPS^{G+,log\,measurement}(t) \\ RTWP^{G+,log\,measurement}(t) \end{pmatrix} \quad (61)$$

$$c(x^{G+}(t)) = \begin{pmatrix} 10\log^{10}\left(\frac{x^{G+}_{RSEPSPower}(t)}{x^{G+}_{RSEPSPower}(t)+x^{G+}_{Residual}(t)}\right) \\ 10\log^{10}(\kappa^{G+}_{u_{max}(t)}(x^{G+}_{RSEPSPower}(t)+x^{G+}_{Residual}(t)))+30 \end{pmatrix} \quad (62)$$

$$e^{G+}(t) = \begin{pmatrix} e^{G+}_{log\,RSEPSCompensated}(t) \\ e^{G+}_{log\,RTWPCompensated}(t) \end{pmatrix} \quad (63)$$

$$R^{G+}_2(t) = \left(\frac{10}{\log(10)}\right)^2 \cdot \quad (64)$$
$$\left(\begin{pmatrix}\frac{1}{RSEPS^{G+,powermeasurement}}\end{pmatrix} \begin{pmatrix}\frac{-1}{RTWP^{G+,powermeasurement}(t)}\end{pmatrix} \atop 0 \quad \begin{pmatrix}\frac{1}{RTWP^{pG+,owermeasurement}(t)}\end{pmatrix}\right).$$
$$\begin{pmatrix} R^{G+}_{2,RSEPSPower} & 0 \\ 0 & R^{G+}_{2,RTWP} \end{pmatrix}.$$
$$\left(\begin{pmatrix}\frac{1}{RSEPS^{G+,powermeasurement}}\end{pmatrix} \quad 0 \atop \begin{pmatrix}\frac{-1}{RTWP^{G+,powermeasurement}(t)}\end{pmatrix} \begin{pmatrix}\frac{1}{RTWP^{G+,powermeasurement}(t)}\end{pmatrix}\right).$$

RSEPS Measurement Modeling—Linear Processing

Another approach is to simply disregard the nonlinear measurement equations, and go directly for the power quantities measured in the ASIC. This gives the linear measurement equations:

$$c(x^{G+}(t)) = \begin{pmatrix} \kappa^{G+}_{u_{max}(t)}x^{G+}_{RSEPSPower}(t) + \kappa^{G+}_{u_{max}(t)}e^{G+}_{RSEPSPower}(t) \\ \kappa^{G+}_{u_{max}(t)}(x^{G+}_{RSEPSPower}(t)+x^{G+}_{Residual}(t)) + \kappa^{G+}_{u_{max}(t)}e^{G+}_{RTWP}(t) \end{pmatrix} \quad (65)$$

The corresponding measurement covariance matrix becomes:

$$R^{G+}_2(t) = \begin{pmatrix} (\kappa^{G+}_{u_{max}(t)})^2 R^{G+}_{2,RSEPSPower} & 0 \\ 0 & (\kappa^{G+}_{u_{max}(t)})^2 R^{G+}_{2,RTWP} \end{pmatrix}. \quad (66)$$

The IC scale factor compensation will be automatically handled by the Kalman filter because of the definition of the states and measurement equations. Specifically this means that the estimated residual power can be used for noise floor estimation in the sub-sequent processing steps. This is not discussed here though.

Today, it is common practice to implement the computationally most intense parts of the WCDMA uplink radio receivers on application specific integrated circuits (ASICs). Typically, such ASICs provides RAKE, GRAKE or GRAKE+ receiver processing for a multitude of users, using dedicated parallel hardware. It is e.g. previously known to implement channel estimation, weight combining, demodulation and decoding on such ASICS, for multiple users. To achieve this, the ASICS may be equipped with dedicated accelerators e.g. for TURBO decoding, matrix operations and similar. This is facilitated by the fact that ASICS can be programmed to perform different tasks, exploiting a variety of such hardware accelerator resources. Similar advantages may be obtained by using digital signal processors. According to a preferred embodiment of the present invention, dedicated processing means for load estimation is implemented by an application specific integrated circuit and/or a digital signal processor.

In a preferred embodiment of an arrangement for noise rise estimation in a wireless communication system, at least a part of the functionality of the processor as illustrated in FIG. 5 is implemented by at least one of an Application Specific Integrated Circuit (ASIC) and a Digital Signal Processor (DSP). The embodiment presents ASIC implementation of at least a subset of the above described functionality.

ABBREVIATIONS

ASIC—Application Specific Integrated Circuits
C/I—Code power to Interference ratio
DSP—Digital Signal Processor
EUL—Enhanced UpLink
GRAKE—Generalized RAKE
IC—Interference Cancellation
RBS—Radio Base Station
RoT—Rise over Thermal
RSEPS—Received Scheduled Enhanced dedicated channel Power Share
RTWP—Received Total Wideband Power
SINR—Signal to Interference and Noise Ratio
SIR—Signal to Interference Ratio UE—User Equipment
WCDMA—Wideband Code Division Multiple Access

The invention claimed is:

1. A method for noise rise estimation in a wireless communication system, said method comprising the steps of:
receiving radio signals intended for a plurality of users;
performing an interference whitening on said received radio signals based on one of GRAKE, GRAKE+ and chip equalizer with respect to a first user of said plurality of users;
determining a useful signal power for said first user after said interference whitening for a plurality of time instances;
deriving a first user noise floor compensation factor based on combining weights for said first user used in said interference whitening;
estimating a probability distribution for a compensated useful signal power for said first user from at least said determined useful signal power for said first user and said first user noise floor compensation factor;
computing a conditional probability distribution of a noise floor measure based on at least said determined useful signal power for said first user and said first user noise floor compensation factor; and
calculating a noise rise measure for said first user, based at least on said compensated useful signal power for said first user and said conditional probability distribution of a noise floor measure.

2. The method according to claim 1, further comprising:
performing an interference whitening on said received radio signals based on one of GRAKE, GRAKE+ and chip equalizer with respect to respective ones of said plurality of users;
determining a respective useful signal power for said plurality of users after said interference whitening for a plurality of time instances; and
selecting said first user from said plurality of users based on interference situation after said interference whitening.

3. The method according to claim 2, wherein said selecting said first user from said plurality of users is a selection of said first user as the user of said plurality of users having a worst interference situation after said interference whitening.

4. The method according to claim 2, further comprising:
deriving a respective user noise floor compensation factor for said plurality of users based on combining weights for said plurality of users used in said interference whitening;
said selecting being a selection of said first user as the user of said plurality of users having the largest ratio between said respective useful signal power and said respective user noise floor compensation factor.

5. The method according to claim 1, further comprising:
performing an interference whitening on said received radio signals based on one of GRAKE, GRAKE+ and chip equalizer with respect to respective ones of said plurality of users;
determining a useful signal power for said plurality of users after said interference whitening for a plurality of time instances;
deriving a respective user noise floor compensation factor for said plurality of users based on combining weights for a respective user used in said interference whitening;
estimating a probability distribution for a compensated useful signal power for said plurality of users from at least said determined useful signal power for said plurality of users and respective said user noise floor compensation factor;
computing a respective conditional probability distribution of a noise floor measure for said plurality of users based on at least said determined useful signal power for said plurality of users and respective said user noise floor compensation factor;
calculating a respective noise rise measure for said plurality of users, based at least on said compensated useful signal power for said plurality of users and respective said conditional probability distribution of a noise floor measure; and
combining said respective noise rise measures into a system noise rise measure.

6. The method according to any of the claims 1, further comprising:
determining a RSEPS (Received Scheduled Enhanced Uplink Power Share) power after said interference whitening for a plurality of time instances;
said estimating step and said computing step being further based on said determined RSEPS power.

7. The method according to claim 1, wherein said first user noise floor compensation factor is derived as the product of a conjugate transpose of said combining weights and said combining weights as an approximation for white noise power floor.

8. The method according to claim 1, wherein said first user noise floor compensation factor is derived as a trace of the product of a conjugate transpose of said combining weights, a thermal noise covariance matrix representing a correlation due to a spectral shape of a whole wideband channel and said combining weights divided by a trace of said thermal noise covariance matrix, for colored noise power floor.

9. The method according to claim 1, wherein said steps of estimating a probability distribution for a compensated useful signal power and computing a conditional probability distribution of a noise floor measure involve at least one Kalman filtering step.

10. An arrangement for noise rise estimation in a wireless communication system, comprising:
a digital receiver;
an interference whitener connected to said digital receiver;
said interference whitener being based on one of GRAKE, GRAKE+ and chip equalizer;
said interference whitener being arranged for providing interference whitening for a plurality of users at an output;
a processor connected to said output from said interference whitener;
said processor being arranged for determining a useful signal power for a first user for a plurality of time instances;
said processor being further arranged for deriving a first user noise floor compensation factor based on combining weights for said first user used in said interference whitening;
said processor being further arranged for estimating a probability distribution for a compensated useful signal power for said first user from at least said determined useful signal power for said first user and said first user noise floor compensation factor;
said processor being further arranged for computing a conditional probability distribution of a noise floor measure based on at least said determined useful signal power for said first user and said first user noise floor compensation factor; and
said processor being further arranged for calculating a noise rise measure for said first user, based at least on said probability distribution for said compensated useful signal power for said first user and said conditional probability distribution of a noise floor measure.

11. The arrangement according to claim 10, wherein:
said processor is further arranged for determining a respective useful signal power for said plurality of users after said interference whitening for a plurality of time instances; and
said processor is further arranged for selecting said first user from said plurality of users based on interference situation after said interference whitening.

12. The arrangement according to claim 11, wherein said processor is further arranged for performing a selection of said first user as the user of said plurality of users having a worst interference situation after said interference whitening.

13. The arrangement according to claim 12, wherein:
said processor is further arranged for deriving a respective user noise floor compensation factor for said plurality of users based on combining weights for said plurality of users used in said interference whitening; and
said processor is further arranged for performing said selection of said first user as the user of said plurality of users having the largest ratio between said respective useful signal power and said respective user noise floor compensation factor.

14. The arrangement according to claim 10, wherein:
said processor is arranged for determining a useful signal power for said plurality of users after said interference whitening for a plurality of time instances;
said processor is arranged for deriving a respective user noise floor compensation factor for said plurality of users based on combining weights for a respective user used in said interference whitening;
said processor is arranged for estimating a probability distribution for a compensated useful signal power for said plurality of users from at least said determined useful signal power for said plurality of users and respective said user noise floor compensation factor;
said processor is arranged for computing a respective conditional probability distribution of a noise floor measure for said plurality of users based on at least said determined useful signal power for said plurality of users and respective said user noise floor compensation factor;
said processor is arranged for calculating a respective noise rise measure for said plurality of users, based at least on said probability distribution for said compensated useful signal power for said plurality of users and respective said conditional probability distribution of a noise floor measure; and
said processor is arranged for combining said respective noise rise measures into a system noise rise measure.

15. The arrangement according to claim 10, wherein:
said processor is further arranged for determining a RSEPS (Received Scheduled Enhanced Uplink Power Share) power after said interference whitening for a plurality of time instances; and
said processor is further arranged for performing said estimating and said computing based on said determined RSEPS power.

16. The arrangement according to claim 10, wherein said processor is further arranged for deriving said first user noise floor compensation factor as the product of a conjugate transpose of said combining weights and said combining weights as an approximation for white noise power floor.

17. The arrangement according to claim 10, wherein said processor is further arranged for deriving said first user noise floor compensation factor as a trace of the product of a conjugate transpose of said combining weights, a thermal noise covariance matrix representing a correlation due to a spectral shape of a whole wideband channel and said combining weights divided by a trace of said thermal noise covariance matrix, for colored noise power floor.

18. The arrangement according to claim 11, wherein said processor is arranged for performing said estimating a probability distribution for a compensated useful signal power and said computing a conditional probability distribution of a noise floor measure by at least one Kalman filter step.

19. The arrangement according to claim 10, wherein at least said processor is implemented by at least one of an application specific integrated circuit and a digital signal processor.

20. A base station of a wireless communication system comprising an arrangement for noise rise estimation comprising:
a digital receiver;
an interference whitener connected to said digital receiver;
said interference whitener being based on one of GRAKE, GRAKE+ and chip equalizer;
said interference whitener being arranged for providing interference whitening for a plurality of users at an output;
a processor connected to said output from said interference whitener;
said processor being arranged for determining a useful signal power for a first user for a plurality of time instances;
said processor being further arranged for deriving a first user noise floor compensation factor based on combining weights for said first user used in said interference whitening;
said processor being further arranged for estimating a probability distribution for a compensated useful signal power for said first user from at least said determined useful signal power for said first user and said first user noise floor compensation factor;
said processor being further arranged for computing a conditional probability distribution of a noise floor measure based on at least said determined useful signal power for said first user and said first user noise floor compensation factor; and
said processor being further arranged for calculating a noise rise measure for said first user, based at least on said probability distribution for said compensated useful signal power for said first user and said conditional probability distribution of a noise floor measure.

* * * * *

UNITED STATES PATENT AND TRADEMARK OFFICE
CERTIFICATE OF CORRECTION

PATENT NO. : 8,665,937 B2  
APPLICATION NO. : 13/514009  
DATED : March 4, 2014  
INVENTOR(S) : Wigren Page 1 of 1

It is certified that error appears in the above-identified patent and that said Letters Patent is hereby corrected as shown below:

In the Specification

In Column 2, Line 21, delete "matrix" and insert -- matrix $\hat{R}_u$ --, therefor.

In Column 8, Line 33, delete "for each" and insert -- 56 for each --, therefor.

In Column 8, Line 46, delete "for a user" and insert -- 52 for a user --, therefor.

In Column 13, Line 60, delete " $|e_{u,k}|^2 2 = \hat{h}_u^H \hat{h}_u |s_{u,k}|^2,$ " and insert -- $|e_{u,k}|^2 = \hat{h}_u^H \hat{h}_u |s_{u,k}|^2,$ --, therefor.

In Column 21, Lines 53-58, delete "
$$R_2^{G+}(t) = \left(\frac{10}{\log(10)}\right)^2 \cdot \left(\left(\frac{1}{RSEPS^{G+,powermeasurement}}\right) \left(\frac{-1}{RTWP^{G+,powermeasurement}(t)}\right)\right)$$
$$0 \quad \left(\frac{1}{RTWP^{pG+,powermeasurement}(t)}\right)$$
" and insert --
$$R_2^{G+}(t) = \left(\frac{10}{\log(10)}\right)^2 \cdot \left(\left(\frac{1}{RSEPS^{G+,powermeasurement}}\right) \left(\frac{-1}{RTWP^{G+,powermeasurement}(t)}\right)\right)$$
$$0 \quad \left(\frac{1}{RTWP^{pG+,powermeasurement}(t)}\right)$$
 --, therefor.

Signed and Sealed this  
Fifteenth Day of July, 2014

Michelle K. Lee  
*Deputy Director of the United States Patent and Trademark Office*